United States Patent [19]

Yamamoto et al.

[11] Patent Number: 4,681,863
[45] Date of Patent: Jul. 21, 1987

[54] HIGH-DENSITY MAGNESIA-CALCIA CLINKER AND PROCESS FOR PRODUCTION THEREOF

[75] Inventors: Kosei Yamamoto; Akira Kaneyasu; Yo Arita, all of Ube, Japan

[73] Assignee: Ube Chemical Industries Co., Ltd., Yamaguchi, Japan

[21] Appl. No.: 755,782

[22] Filed: Jul. 17, 1985

[51] Int. Cl.$^4$ .............................. C04B 35/04
[52] U.S. Cl. ............................ 501/108; 501/122; 423/636
[58] Field of Search ............... 106/121; 501/108, 122; 423/636

[56] References Cited

U.S. PATENT DOCUMENTS

| | | | |
|---|---|---|---|
| 2,280,515 | 4/1942 | Ridgway et al. | 106/121 |
| 3,221,082 | 11/1965 | Leatham | 106/121 |
| 3,280,228 | 10/1966 | Pack et al. | 106/121 |
| 3,965,240 | 6/1976 | Hughey | 423/636 |
| 4,126,478 | 11/1978 | Bowman | 501/122 |

FOREIGN PATENT DOCUMENTS 56-32322 4/1981 Japan .................................. 423/636

Primary Examiner—William R. Dixon, Jr.
Assistant Examiner—Steven Capella
Attorney, Agent, or Firm—Sherman and Shalloway

[57] ABSTRACT

A magnesia-calcia clinker having a high density, said clinker containing MgO, CaO and $Fe_2O_3$ as oxides, having the following chemical composition in percent by weight
MgO, CaO and $Fe_2O_3$: at least 99% in total
MgO: at least 10%
$Fe_2O_3$: 0.2–5%
and having a density corresponding to at least 97.5% of the theoretical density. The above magnesia-calcia clinker can be produced by adding a water-soluble iron compound to sea water, bittern or brine, simultaneously with, or after, the addition of the water-soluble iron compound, adding a calcined product of dolomite, lime or a hydrate thereof to form a precipitate composed mainly of magnesium hydroxide, mixing the resulting magnesium hydroxide with a calcium compound, and dead-burning the resulting mixture.

15 Claims, 7 Drawing Figures

HIGH-DENSITY MAGNESIA-CALCIA CLINKER AND PROCESS FOR PRODUCTION THEREOF

BACKGROUND OF THE INVENTION

1. Field of the Invention

This invention relates to a magnesia-calcia clinker having a high density, and a process for its production.

2. Description of the Prior Art

As the converter operating conditions have become severer in recent years with the employment of the pure oxygen bottom-blowing system in place of LD Process, the conventional magnesia-calcia (CaO-MgO) brick for refractories has rapidly been superseded by a magnesia-carbon (MgO-C) brick. Recently, a combined blowing method comprising a combination of the pure oxygen top-blow and bottom-blow methods came into acceptance, and the operating conditions have become much severer as reflected, for example, by the higher operating temperature.

The severer operating conditions weaken the matrix portion of the MgO-C brick presumably because they induce the reaction of MgO with C to reduce MgO. The development of furnace materials of the magnesia-calcia-carbon (MgO-CaO-C) type has now been under way in an attempt to provide a high-quality brick which can replace the MgO-C type brick, but no MgO-CaO-C brick of sufficiently high quality has yet been developed.

Previously known CaO-MgO clinkers for use in the production of the MgO-CaO-C type brick included a clinker of naturally occurring dolomite obtained by calcining dolomite ore, and a synthetic magnesia-enriched dolomite clinker produced by adding lime or lime milk to magnesium hydroxide [Mg(OH)$_2$] obtained by the sea water-lime method, adjusting the MgO content, and calcining it. The naturally occurring dolomite clinker and the synthetic magnesia-enriched dolomite clinker both contain low-melting minerals of the MgO, CaO or SiO$_2$ type or the CaO, Fe$_2$O$_3$, Al$_2$O$_3$ type distributed in the matrix portion. The low-melting minerals are formed by the reaction during the calcination of a flux source such as SiO$_2$, Fe$_2$O$_3$ or Al$_2$O$_3$ added to the uncalcined dolomite or a mixture of Mg(OH)$_2$ and Ca(OH)$_2$ for the purpose of increasing the hydration resistance of the clinker. The low-melting minerals improve the hydration resistance of the clinker, but have the defect of reducing the thermal properties and slag corrosion resistance of the clinker. Accordingly, if a MgO-CaO-C brick produced from the aforesaid naturally occurring dolomite clinker or synthetic magnesia-enriched clinker is used as a lining refractory of the converter under the present-day rigorous converter operating conditions, it is unsatisfactory in regard to thermal properties, slag corrosion resistance, etc.

With the above-mentioned background, the production of a highly pure magnesia-calcia clinker with a low impurity content has aroused interest, and attempts have in fact been made to produce a highly pure magnesia-calcia type refractory by using high-purity, high-density magnesia or electrically fused magnesia as a magnesia source and high-purity electrically fused calcia as a calcia source and mixing them in accordance with a suitable particle size distribution. The resulting high-purity magnesia-calcia type refractory, however, is said to have the defect of peeling because the distribution of MgO and CaO is non-uniform.

SUMMARY OF THE INVENTION

It is an object of this invention therefore to provide novel magnesia-calcia clinker having a high density.

Another object of this invention is to provide a magnesia-calcia clinker which has a very high density in spite of containing iron in an amount of up to 5% by weight as Fe$_2$O$_3$.

Still another object of this invention is to provide a high-density magnesia-calcia clinker containing iron as a solid solution in periclase crystals.

Yet another object of this invention is to provide a novel process for producing the aforesaid magnesia-calcia clinker of this invention having a high density.

Further objects of this invention will become apparent from the following detailed description.

According to this invention, the above objects and advantages are achieved by a magnesia-calcia clinker having a high density, said clinker containing MgO, CaO and Fe$_2$O$_3$ as oxides, having the following chemical composition in percent by weight MgO, CaO and Fe$_2$O$_3$: at least 99% in total MgO: at least 10%

Fe$_2$O$_3$: 0.2–5% and having a density corresponding to at least 97.5% of the theoretical density (d) defined by the following equation $$d = \frac{A \times B \times 100}{(A-B)x + 100B} \left( = \frac{120288}{0.22x + 336} \right)$$

wherein A is the theoretical density (=3.58 g/cm$^3$) of periclase (MgO), B is the theoretical density (=3.36 g/cm$^3$) of calcia (CaO), and x is the proportion in % by weight of CaO based on the total amount of CaO and MgO in the magnesia-calcia clinker.

BRIEF DESCRIPTION OF THE ACCOMPANYING DRAWINGS

DETAILED DESCRIPTION OF PREFERRED EMBODIMENTS OF THE INVENTION

Figure 1:
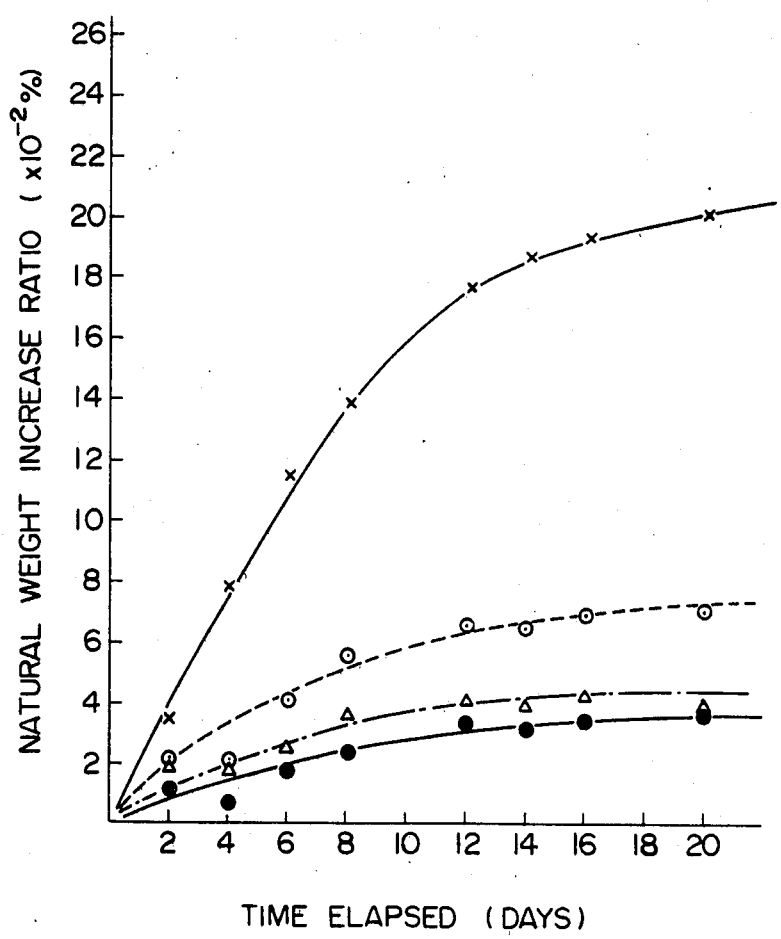
FIG. 1 shows the hydration resistance of the magnesia-calcia clinkers of the invention and the hydration resistance of comparative magnesia-calcia clinkers produced by a known process.

To the best of the knowledges of the present inventors, most of the known magnesia-calcia clinkers have a bulk density of not more than 3.40 g/cc (see "Taikabutsu" (Refractories), 35–388, 1983,No. 7, pages 26–30, and Technical Bulletin of Kawasaki Rozai K. K., No. 4, 1973, pages 51–63). As the only exception, a magnesia-calcia clinker consisting of 73.38% by weight of MgO, 26.18% by weight of CaO and 0.02% by weight of Fe$_2$O$_3$ is known to have a bulk density of 3.43 g/cc (Ceramics, 15, 1980, No. 3, pages 176–183). This magnesia-calcia clinker having a bulk density of 3.43 is characterized by its very low Fe$_2$O$_3$ content, and its density (3.43 g/cc) is below 97.5% of the theoretical density calculated in accordance with the above-given equation.

The high-density magnesia-calcia clinker of this invention contains MgO, CaO and $Fe_2O_3$ as essential ingredients. The MgO content is at least 10% by weight, preferably 10 to 90% by weight, and the $Fe_2O_3$ content is 0.2 to 5% by weight, preferably 0.2 to 3% by weight. The magnesia-calcia clinker of the invention contains at least a part of iron as a solid solution in periclase crystals, and its amount reaches at least 30% of the iron ingredient contained. The clinker of the invention preferably contains at least 10% by weight, more preferably 10 to 89.8% by weight, of CaO as oxide.

The magnesia-calcia clinker of the invention may further contain not more than 0.8% by weight of $SiO_2$, not more than 0.15% by weight of and not more than 0.05% by weight of $B_2O_3$.

The preferred density of the magnesia-calcia clinker of this invention is at least 98% of the theoretical density calculated in accordance with the equation given hereinabove.

According to this invention, the high-density magnesia-calcia clinker of the invention can be produced by a process which comprises adding a water-soluble iron compound to sea water, bittern or brine; simultaneously with or subsequently to the addition of the water-soluble iron compound, adding calcined dolomite, lime or a hydrate thereof thereby to form a precipitate composed mainly of magnesium hydroxide; mixing the resulting magnesium hydroxide with a calcium compound; and calcining the resulting mixture.

The magnesium-containing aqueous solution used in the process of this invention is sea water, bittern or brine, preferably decarbonized sea water, bittern or brine. The decarbonized solution can be obtained by adding an alkaline compound such as lime or calcium hydroxide or a strong acid such as sulfuric acid to sea water, bittern or brine in a known manner.

It is well known that the addition of an alkaline compound such as calcium hydroxide to the carbonized solution results in the precipitation of magnesium hydroxide. It is essential in the process of this invention to add a water-soluble iron compound to the magnesium-containing aqeuous solution before or simultaneously with the addition of the alkaline compound. When the water-soluble iron compound is added after the addition of the alkaline compound, it is at least extremely difficult to produce the high-density magnesia-calcia clinker contemplated by the present invention.

According to the process of this invention which involves adding the water-soluble iron compound to the magnesium-containing aqueous solution before or simultaneously with the addition of the alkaline compound, a high-density magnesia-calcia clinker is obtained which has a higher density than that obtained by a conventional process which involves adding the water-soluble iron compound after the addition of the alkaline compound. The reason for this is not entirely clear, but it is presumed that according to the process of this invention, when the alkaline compound is added to the magnesium-containing aqueous solution containing the water-soluble iron compound, fine iron hydroxide particles first form, and then magnesum hydroxide forms around the iron hydroxide particles as a nucleus, and therefore that the water-soluble iron compound acts advantageously on the formation of the magnesium hydroxide precipitate, and on the other hand, it allows little opportunity of forming low-melting compounds in the calcination process.

The water-soluble iron compound may be an inorganic or organic acid salt of divalent iron or trivalent iron. The inorganic salts, particularly mineral acid salts, are preferred iron compounds. Examples of the water-soluble iron compound include inorganic salts such as iron chloride, iron sulfate, iron nitrate and iron phosphate, and organic acid salts such as iron acetate, iron benzoate and iron p-toluenesulfonate. The water-soluble iron compound can be added in an amount of 0.2 to 5% by weight, on the ignition basis, to the precipitate composed mainly of magnesium hydroxide.

The alkaline compound is added to the magnesium-containing aqueous solution containing the water-soluble iron compound such that the pH of the aqueous solution becomes at least 10.8, preferably at least 11, for example 11 to 12, at which magnesium hydroxide forms. When the pH of the aqueous solution exceeds 10.8, the alkaline compound added is in a slightly excessive amount. By so doing, magnesium hydroxide having a low boron content, and consequently a magnesia calcia clinker having a low boron content, can be formed. When the pH of the aqueous solution is 11 to 12, the amount of the alkaline compound in the reaction solution is slightly excessive. Preferably, therefore, before separating the precipitate composed mainly of magnesium hydroxide from the reaction solution, the reaction solution is reacted with an aqueous solution of decarbonized sea water, bittern or brine to dissolve the excess of the alkaline compound. By this procedure, a precipitate of magnesium hydroxide having decreased contents of boron and calcium can be obtained.

Besides lime, a calcined product of dolomite or a hydrate of lime or calcined dolomite may be cited as examples of the alkaline compound.

According to the process of this invention, the resulting precipitate composed mainly of magnesium hydroxide is separated, for example, by using a thickener, washed with water as required, and then mixed with a calcium compound such as calcium hydroxide or lime milk. The mixture is press-formed, and then dead-burnt.

The dead-burning is carried out usually at a temperature of 1800° to 2100° C. for about 15 minutes to 1 hour. The press-forming is carried out preferably under a pressure of 0.2 to 2 tons/cm$^2$ so as to give a molded product having a density of about 1.0 to 1.8 g/cm$^3$. According to this invention, a silicon compound in an amount of not more than 0.8% by weight as $SiO_2$ based on the magnesia-calcia clinker may be added to the magnesium hydroxide precipitate before the dead-burning is carried out.

For a better understanding of the process of this invention, preferred embodiments of this invention up to the formation of the magnesium hydroxide precipitate are described below.

For example, an aqueous solution of iron sulfate is added to decarbonized sea water, and simultaneously with, or after, this addition, lime is added to form a reaction solution having a pH of 11.2 to 11.8. Thus, a precipitate composed mainly of magnesium hydroxide and having a CaO/MgO weight ratio (%) of about 2 to 4%, an $SiO_2$/MgO weight ratio of about 0.05 to 0.2%, and a $Fe_2O_3$/MgO ratio of about 0.2 to 3% is formed. Before this precipitate is separated from the reaction solution, an aqueous solution of decarbonized sea water is added to the reaction solution to form a precipitate composed mainly of magnesium hydroxide and having a CaO/MgO weight ratio (%) of about 1.8 to 3.0%, an SiO$_2$/MgO weight ratio of about 0.05 to 0.25% and an Fe$_2$O$_3$/MgO weight ratio of about 0.2 to 3%. Or without performing this treatment, the precipitate is separated, and then washed, as required, to form a precipitate composed mainly of magnesium hydroxide and having a CaO/MgO weight ratio of about 1.4 to 1.8%, an SiO$_2$/MgO weight ratio of about 0.05 to 0.30% and an Fe$_2$O$_3$/MgO weight ratio of about 0.2 to 3%.

The process of this invention described above thus gives the magnesia-calcia clinker having a high density in spite of its high iron content.

The magnesia-calcia clinker produced by the process of this invention which comprises adding the water-soluble iron compound before, or simultaneously with, the addition of the alkaline compound to the magnesium-containing aqeuou solution differs clearly from the conventional magnesia-calcia clinkers wherein substantially all of the iron ions therein form low-melting minerals and are distributed in the matrix portion in that in the former, at least a part of the iron ions are dissolved as a solid solution in the periclase crystals. This is clearly shown by the CaK$\alpha$ X-ray patterns, FeK$\alpha$ X-ray patterns and secondary electron image of the magnesia-calcia clinker obtained in Example 2 and the magnesia-calcia clinker obtained in Comparative Example 1 given hereinbelow.

The magnesia-calcia clinker in accordance with this invention shows a high iron content in the periclase crystals, and a low iron content in a calcia crystal portion, among crystal grains of magnesia and calcia, and in triple points. On the other hand, the comparative magnesia-calcia clinker shows a high iron content among crysta grains of magnesia and calcia and in triple points and hardly contains iron in the periclase crystals.

Surprisingly, the high-density magnesia-calcia clinker of this invention shows much better hydration resistance to the conventional magnesia-calcia clinkers. Since the high-density magnesia-calcia clinker of this invention contains iron in the periclase crystals, it is believed that when it is used as a raw material for an MgO-CaO-C type refractory, a moderate MgO dense layer forms in the refractory and therefore the refractor shows improved slag resistance.

The following examples illustrate the present invention in greater detail. It should be understood that these examples do not in any way limit the present invention.

The various property values in the present specification were measured by the following methods.

Chemical Composition

Measured in accordance with "Method 1. Method of Chemical Analysis of Magnesia Clinkers" (see the 1981 edition of Refractory Notebook) set down by the Subcommittee on Testing Methods, the 124th Committee of Japan Society for the Promotion of Science. Analysis of B$_2$O$_3$ was carried out by the Curcumin method (absorbance method) considered and accepted by the aforesaid Committee.

Bulk density

Determined from the following calculation formula in accordance with "Method 2. Methods of Measuring the Apparent Porosity, Apparent Density and Bulk Density of Magnesia Clinkers" (see the 1981 edition of Refractory Notebook) set down by the Subcommittee on Testing Methods, the 124th Committee of Japan Society for the Promotion of Science.

$$\text{Bulk density} = \frac{W_1}{W_3 - W_2} \times S$$

$W_1$: Dry weight (g) of the clinker
$W_2$: Weight (g) in kerosene of a sample saturated with kerosene
$W_3$: Weight (g) of the sample saturated with kerosene
$S$: Specific gravity (g/cm$^3$) of kerosene at the measuring temperature.

EXAMPLE 1

A solution of FeSO$_4$ was added to decarbonated sea water so that the ratio of Fe ions to Mg ions became 0.4:100 as the weight ratio of Fe$_2$O$_3$ to MgO. Purified Ca(OH)$_2$ milk was added to the mixture to form a slurry containing Mg(OH)$_2$ as a main component. At this time, the pH of the reaction solution was 11.7. The slurry was washed with fresh water, and the Mg(OH)$_2$ slurry and purified Ca(OH)$_2$ milk were added in an MgO/CaO weight ratio of 75:25 and mixed. The mixed slurry was filtered, and a solution of FeSO$_4$ and a solution of water glass were added to the cake. The mixture was dried and molded. The molded product was dead-burnt at 1900° C. for 30 minutes to produce a magnesia-calcia clinker.

Table 1 shows the bulk density and chemical analysis values of the resulting clinker, and the degree of its sintering based on its theoretical density calculated in accordance with the equation given hereinabove. The resulting clinker was subjected to a hydration resistance test (spontaneous weight increase test), and its result is shown in FIG. 1 as indicated by black circles.

TABLE 1

| Sample No. | 1 |
|---|---|
| Bulk density | 3.48 |
| Degree of sintering (%) | 98.7 |
| Chemical analysis values (%) | |
| MgO | 75.04 |
| CaO | 22.96 |
| Fe$_2$O$_3$ | 0.73 |
| SiO$_2$ | 0.80 |
| Al$_2$O$_3$ | 0.100 |
| B$_2$O$_3$ | 0.02 |

EXAMPLES 2–6

A solution of FeSO$_4$ was added to decarbonated sea water so that the ratio of Fe ions to Mg ions became 1.2:100 as the Fe$_2$O$_3$/MgO weight ratio.

Purified Ca(OH)$_2$ milk was added to the sea water to form a slurry containing Mg(OH)$_2$ as a main ingredient. The pH of the reaction solution at this time was 11.7. The resulting slurry was washed with fresh water, and this Mg(OH)$_2$ slurry and purified Ca(OH)$_2$ milk were mixed so that the MgO/CaO weight ratio became 75:25, 40–:60, and 20:80, respectively. The mixed slurry was filtered, and the cake was dried either as such or after adding an FeSO$_4$ solution or a solution of water glass. The dried mixture was then molded, and then dead-burnt at 1900° C. for 40 minutes to produce magnesia-calcia clinkers.

Table 2 shows the bulk densities, degrees of sintering and chemical analysis values of the resulting clinkers.

Figure 2A:
FIGS. 2a, 2b and 2c are a CaK$\alpha$ X-ray image, a FeK$\alpha$ X-ray image and a secondary electron image of the magnesia-calcia clinker of the invention.
Figure 2B:
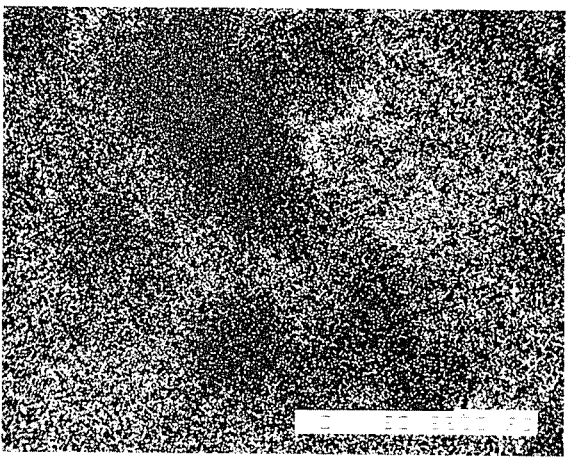
Figure 2C:
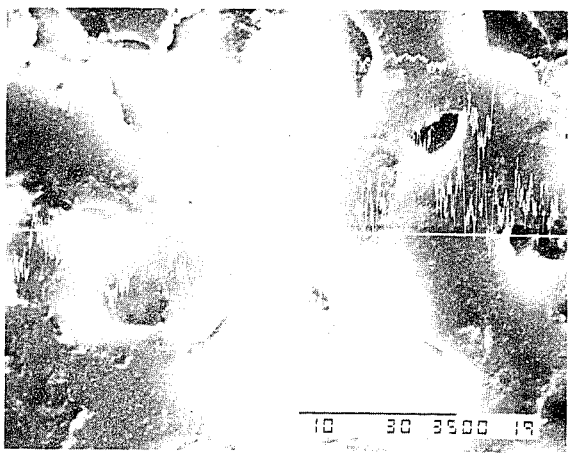

The results of observing sample No. 2 under a scanning electron microscope are shown in FIGS. 2a, 2b and 2c.

FIG. 2a is a CaKα X-ray pattern of the sample; FIG. 2b, an FeKα X-ray pattern of the sample; and FIG. 2c, a secondary electron image of the sample. The serrate curves crossing the straight line shown nearly at the center of the photo of FIG. 2c show changes in the concentration of iron in the clinker along the straight line. FIGS. 2a, 2b and 2c show the same part of the sample.

The results of the hydration test are shown by curves marked by triangles (sample 2) and white circle (sample 3) in FIG. 1.

TABLE 2

| Sample No. | Bulk density | Degree of sintering (%) | Chemical analysis values (%) | | | | | |
|---|---|---|---|---|---|---|---|---|
| | | | MgO | CaO | $Fe_2O_3$ | $SiO_2$ | $Al_2O_3$ | $B_2O_3$ |
| 2 | 3.48 | 98.8 | 72.78 | 25.20 | 0.77 | 0.80 | 0.100 | 0.024 |
| 3 | 3.47 | 98.4 | 75.86 | 22.61 | 1.01 | 0.16 | 0.110 | 0.013 |
| 4 | 3.46 | 98.4 | 71.62 | 26.60 | 0.65 | 0.14 | 0.096 | 0.035 |
| 5 | 3.40 | 98.8 | 38.46 | 60.34 | 0.38 | 0.10 | 0.078 | 0.023 |
| 6 | 3.34 | 97.9 | 23.40 | 75.60 | 0.19 | 0.11 | 0.072 | 0.008 |

EXAMPLES 7-9

A solution of $FeSO_4$ was added to decarbonized sea water so that the ratio of Fe ions to Mg ions became 3.0:100 as the $Fe_2O_3/MgO$ weight ratio.

Thereafter, by the same procedure as in Example 2, magesia-calcia clinkers were produced. The results are shown in Table 3.

TABLE 3

| Sample No. | Bulk density | Degree of sintering (%) | Chemical analysis values (%) | | | | | |
|---|---|---|---|---|---|---|---|---|
| | | | MgO | CaO | $Fe_2O_3$ | $SiO_2$ | $Al_2O_3$ | $B_2O_3$ |
| 7 | 3.48 | 98.9 | 72.14 | 25.38 | 1.92 | 0.13 | 0.096 | 0.032 |
| 8 | 3.42 | 98.7 | 47.94 | 50.30 | 1.37 | 0.10 | 0.074 | 0.020 |
| 9 | 3.35 | 98.3 | 22.78 | 76.02 | 0.64 | 0.10 | 0.070 | 0.013 |

EXAMPLES 10-12

A solution of $FeSO_4$ was added to decarbonized sea water so that the ratio of Fe ions to Mg ions became 5.0:100 as the $Fe_2O_3/MgO$ weight ratio.

Thereafter, by the same procedure as in Example 2, magnesia clinkers were produced. The results are shown in Table 4.

TABLE 4

| Sample No. | Bulk density | Degree of sintering (%) | Chemical analysis values (%) | | | | | |
|---|---|---|---|---|---|---|---|---|
| | | | MgO | CaO | $Fe_2O_3$ | $SiO_2$ | $Al_2O_3$ | $B_2O_3$ |
| 10 | 3.48 | 98.8 | 72.84 | 23.14 | 3.28 | 0.18 | 0.102 | 0.038 |
| 11 | 3.42 | 98.5 | 50.90 | 46.06 | 2.30 | 0.14 | 0.076 | 0.025 |
| 12 | 3.36 | 98.6 | 22.76 | 75.84 | 0.94 | 0.11 | 0.070 | 0.018 |

EXAMPLE 13

A solution of $FeSO_4$ was added to decarbonized sea water so that the ratio of Fe ions to Mg ions became 1.0:100 as the $Fe_2O_3$/MgO weight ratio. Simultaneously with this addition, purified $Ca(OH)_2$ milk was added to form a slurry containing $Mg(OH)_2$ as a main component.

The slurry was washed with fresh water, and this $Mg(OH)_2$ slurry and purified $CA(OH)_2$ milk were mixed so that the MgO/CaO weight ratio became 40:60. The mixed slurry was filtered, and the cake was dried and molded. The molded product was dead-burnt at 1900° C. for 30 minutes to form a magnesia-calcia clinker. The results are shown in Table 5.

TABLE 5

| Sample No. | 13 |
|---|---|
| Bulk density | 3.40 |
| Degree of sintering (%) | 98.5 |
| Chemical analysis values (%) | |
| MgO | 42.38 |
| CaO | 56.49 |
| $Fe_2O_3$ | 0.41 |
| $SiO_2$ | 0.14 |
| $Al_2O_3$ | 0.08 |
| $B_2O_3$ | 0.022 |

COMPARATIVE EXAMPLE 1

Purified $Ca(OH)_2$ milk was added to decarbonized sea water to form an $Mg(OH)_2$ slurry. At this time, the pH of the reaction solution was 10.5. The resulting slurry was washed with fresh water, and the $Mg(OH)_2$ slurry and purified $Ca(OH)_2$ milk were mixed so that the MgO/CaO weight ratio became 75:25. The mixed slurry was filtered, and a solution of $FeSO_4$ and a solution of water glass were added to the filtrate. The mixture was dried, molded, and then dead-burnt at 1900° C. for 30 minutes to form a magnesia-calcia clinker.

The results are shown in Table 6.

Figure 3A:
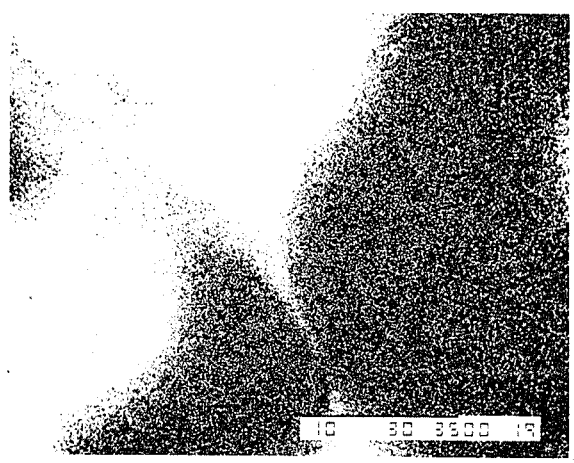
FIGS. 3a, 3b and 3c are a CaK$\alpha$ X-ray image, a FeK$\alpha$ X-ray image and a secondary electron image of a comparative magnesia-calcia clinker produced by the conventional process.
Figure 3B:
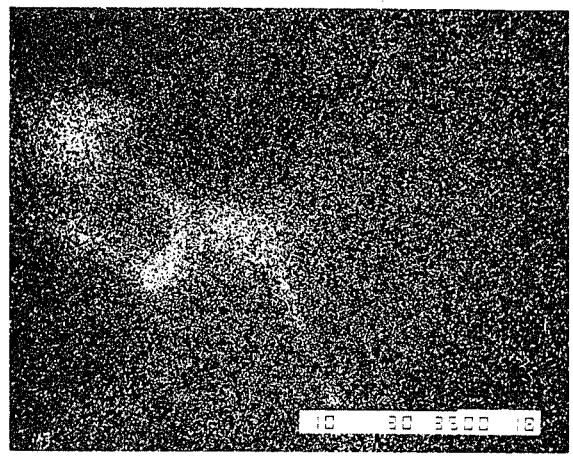
Figure 3C:
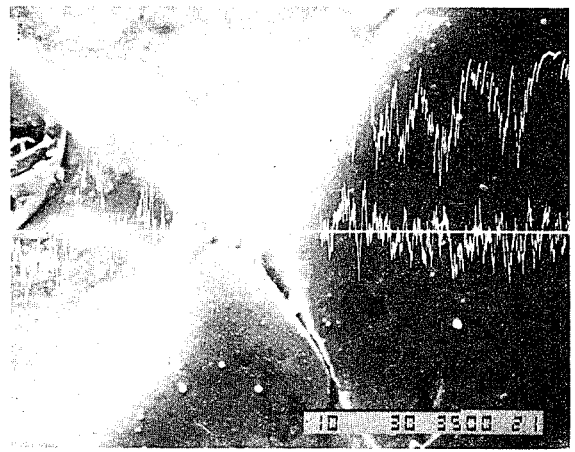

The results of observing the product (sample No. 14) are shown in FIGS. 3a (CaKα X-ray pattern), 3b (FeKα X-ray pattern) and 3c (secondary electron beam pattern). The serrate curves crossing the straight line shown at nearly the central part of the photo of FIG. 3c have the same meaning as in 2c. The results of the hydration resistance test are shown in FIG. 1 by curves marked "X".

TABLE 6

| Sample No. | 14 |
|---|---|
| Bulk density | 3.35 |
| Degree of sintering (%) | 95.0 |
| Chemical analysis values (%) | |
| MgO | 73.18 |
| CaO | 22.20 |
| $Fe_2O_3$ | 1.08 |
| $SiO_2$ | 1.05 |
| $Al_2O_3$ | 0.37 |
| $B_2O_3$ | 0.25 |

COMPARATIVE EXAMPLES 2-4

Purified $Ca(OH)_2$ was added to decarbonized sea water to form a $Mg(OH)_2$ slurry. At this time, the pH of the reaction solution was 11.7. The resulting slurry was washed with fresh water, and then the $Mg(OH)_2$ slurry and purified $Ca(OH)_2$ were mixed so that the MgO/CaO weight ratio became 75:25, 40:60, and 20:80, respectively. The mixed slurry was filtered, and a solution of $FeSO_4$ and a solution of water glass were added to the cake. Or only the FeSO solution was added to the cake. The mixture was dried and molded, and thereafter dead-burnt at 1900° C. for 30 minutes. Thus, magnesia-calcia clinkers were produced. The results are shown in Table 7.

TABLE 7

| Sample No. | Bulk density | Degree of sintering (%) | Chemical analysis values (%) | | | | | |
|---|---|---|---|---|---|---|---|---|
| | | | MgO | CaO | $Fe_2O_3$ | $SiO_2$ | $Al_2O_3$ | $B_2O_3$ |
| 15 | 3.36 | 95.6 | 70.72 | 27.23 | 0.64 | 0.87 | 0.124 | 0.059 |
| 16 | 3.33 | 96.5 | 41.66 | 56.84 | 0.72 | 0.12 | 0.095 | 0.015 |
| 17 | 3.26 | 95.6 | 23.12 | 75.18 | 0.73 | 0.11 | 0.087 | 0.013 |

What is claimed is:

1. A magnesia-calcia clinker having a high density, said clinker containing MgO, CaO and $Fe_2O_3$ as oxides, having the following chemical composition in percent by weight

| MgO, CaO and $Fe_2O_3$ | at least 99% in total |
|---|---|
| MgO | at least 10% |
| CaO | at least 10% |
| $Fe_2O_3$ | 0.2–5% | and having a density corresponding to at least 97.5% of the theoretical density (d) defined by the following equation $$d = \frac{A \times B \times 100}{(A - B)x + 100B} = \frac{120288}{0.22x + 336}$$

wherein A is the theoretical density (=3.58 g/cm$^3$) of periclase (MgO, B is the theoretical density (=3.36 g/cm$^3$) of calcia (CaO), and x is the proportion in % by weight of CaO based on the total amount of CaO and MgO in the magnesia-calcia clinker, and said $Fe_2O_3$ being contained as a solid solution in periclase crystals.

2. The clinker of claim 1 which contains 10 to 90% by weight of MgO as oxide.

3. The clinker of claim 1 which contains 0.2 to 3% by weight of $Fe_2O_3$ as oxide.

4. The clinker of claim 1 which contains not more than 0.8% weight of $SiO_2$ as oxide.

5. The clinker of claim 1 which contains not more than 0.15% by weight of $Al_2O_3$ as oxide.

6. The clinker of claim 1 which contains not more than 0.05% by weight of $B_2O_3$ as oxide.

7. The clinker of claim 1 which has a density corresponding to at least 98% of the theoretical density.

8. A process for producing a magnesia-calcia clinker having a high density, which comprises adding a water-soluble iron compound to sea water, bittern or brine; simultaneously with, or after, the addition of the water-soluble iron compound, adding a calcined product of dolomite, lime or a hydrate thereof to form a precipitate composed mainly of magnesium hydroxide; mixing the resulting magnesium hydroxide with a calcium compound; and dead-burning the resulting mixture.

9. The process of claim 8 wherein the water-soluble iron compound is added in an amount of 0.2 to 5% weight of $Fe_2O_3$ as oxide to the precipitate composed mainly of magnesium hydroxide.

10. The process of claim 8 wherein before the dead-burning, an iron-containing compound and/or a silicon-containing compound is added to the mixture of magnesium hydroxide and the calcium compound.

11. The process of claim 8 wherein the precipitate composed of magnesium hydroxide is formed in the reaction solution having a pH of at least 11.

12. The clinker of claim 1 having the following chemical composition in % by weight:
MgO; 71.62–75.86
CaO: 22.61–26.60
$Fe_2O_3$: 0.65–1.01
$SiO_2$: 0.14–0.80
$Al_2O_3$: 0.096–0.110
$B_2O_3$: 0.013–0.035
said clinker having a bulk density of from 3.46 to 3.48.

13. The clinker of claim 1 having the following chemical composition in % by weight:
MgO: 72.14
CaO: 25.38
$Fe_2O_3$: 1.92
$SiO_2$: 0.13
$Al_2O_3$: 0.096
$B_2O_3$: 0.032
said clinke having a bulk density value of 3.48.

14. The clinker of claim 1 having the following chemical compositiiton in % by weight:
MgO: 72.84
CaO: 23.14
$Fe_2O_3$: 3.28
$SiO_2$: 0.18
$Al_2O_3$: 0.102
$B_2O_3$: 0.038
said clinker having a bulk density value of 3.48.

15. The clinker of claim 1 having the following chemical composition in % by weight:
MgO: 22.76–50.90
CaO: 46.06–76.02
$Fe_2O_3$: 0.19–2.30
$SiO_2$: 0.10–0.14
$Al_2O_3$: 0.070–0.078
$B_2O_3$: 0.008–0.025
said clinker having a bulk density of from 3.34 to 3.42.

* * * * *